United States Patent
Li et al.

(10) Patent No.: US 7,631,420 B2
(45) Date of Patent: Dec. 15, 2009

(54) APPARATUS FOR A WIRE WRAPPING PROCESS

(75) Inventors: Hai Li, Shen-Zhen (CN); You-Hui Zhan, Shen-Zhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 95 days.

(21) Appl. No.: 11/518,796

(22) Filed: Sep. 11, 2006

(65) Prior Publication Data

US 2007/0126452 A1 Jun. 7, 2007

(30) Foreign Application Priority Data

Nov. 26, 2005 (CN) .................. 2005 2 0119388 U

(51) Int. Cl.
*H01R 43/00* (2006.01)

(52) U.S. Cl. .................. 29/748; 29/566.4; 29/751; 140/124; 242/596.8

(58) Field of Classification Search ............. 140/124; 29/566.4, 751; 242/596.8
See application file for complete search history.

(56) References Cited

U.S. PATENT DOCUMENTS

| 827,552 | A | * | 7/1906 | McCloud | 140/51 |
|---|---|---|---|---|---|
| 3,191,281 | A | * | 6/1965 | Cobaugh | 29/752 |
| 3,403,869 | A | * | 10/1968 | Marchisen et al. | 242/597.8 |
| 3,903,936 | A | * | 9/1975 | Bergmann | 140/124 |
| 3,967,661 | A | * | 7/1976 | Scoville et al. | 140/124 |
| 4,069,845 | A | * | 1/1978 | Ward | 140/124 |
| 4,169,310 | A | * | 10/1979 | Murphy | 29/751 |
| 4,329,777 | A | * | 5/1982 | Murphy | 29/751 |
| 4,382,456 | A | * | 5/1983 | Rapp | 140/123 |
| 4,416,578 | A | * | 11/1983 | Behncke | 414/249 |
| 5,036,578 | A | * | 8/1991 | Rivera | 29/566.4 |
| 5,228,612 | A | * | 7/1993 | Kuo et al. | 225/47 |
| 6,321,519 | B1 | * | 11/2001 | Goertz | 57/3 |
| 6,688,549 | B1 | * | 2/2004 | Shen | 242/588 |
| 2008/0308668 | A1 | * | 12/2008 | Qiu | 242/596.8 |

\* cited by examiner

*Primary Examiner*—C. J Arbes
(74) *Attorney, Agent, or Firm*—Zhigang Ma

(57) ABSTRACT

A mounting apparatus includes a base and at least one pair of shoe plates. The shoe plates are formed on a top surface of the base. Each of the shoe plates comprises a plurality of grooves respectively on top surfaces thereof for holding at least one connector. It is simple and economical to using the mounting apparatus for holding a connector during a wire wrapping process.

5 Claims, 2 Drawing Sheets

APPARATUS FOR A WIRE WRAPPING PROCESS

BACKGROUND OF THE INVENTION

1. Field of the Invention

The present invention relates to an apparatus and a method for a wire wrapping process.

2. General Background

In-circuit test (ICT) is typically used to test printed circuit assemblies (PCA) to ensure the proper functioning and operation thereof. If the printed circuit assembly or PCB successfully passes the test, it may be passed on for incorporation into the appropriate sub-assembly or into the final product. If, on the other hand, the PCA fails the test, it may either be repaired or scrapped.

One type of ICT probe that is commonly used today includes a two dimensional grid or array of elongated, spring-loaded test pins or "pogo pins." The test pins or pogo pins may be arranged on a supporting board or substrate so that the pins extend generally outward from the surface of the board. The arrangement of the test pins on the board is similar to a so-called "bed of nails" and such ICT probes are often referred to as "bed of nails" probes or testers. When placed against the PCA to be tested, the various pogo pins comprising the ICT probe make contact with various circuit nodes on PCA test equipment and/or circuitry electrically connected to the various pogo pins in the ICT probe thereafter tests the operation and function of the various components on the PCA to ensure proper operation.

The PCA test equipment is connected to the test pins by connectors and signal lines. There are three types connectors used with PCA test equipment, they are 32 pin connectors, 64 pin connectors and 128 pin connectors. One end of each signal line is twined round a corresponding pin of the connector by a wire wrapping gun, and the other end of each signal line is connected with the test pin of the bed of nails. While such a signal line is twined round a pin of the connector by the wire wrapping gun, a worker has to hold the connector and the wire wrapping gun respectively. The process is unduly cumbersome and time consuming.

What is needed is an apparatus and a method for mounting connectors to make the work of wire wrapping more expedient.

SUMMARY

An mounting apparatus includes a base and at least one pair of shoe plates. The shoe plates are formed on a top surface of the base. Each of the shoe plates comprises plurality of grooves respectively on top surfaces thereof for holding at least one connector.

It is simple and economical to use the mounting apparatus for holding a connector during wire wrapping process.

Other advantages and novel features will become more apparent from the following detailed description when taken in conjunction with the accompanying drawings, in which:

DETAILED DESCRIPTION OF THE EMBODIMENTS

Figure 1:
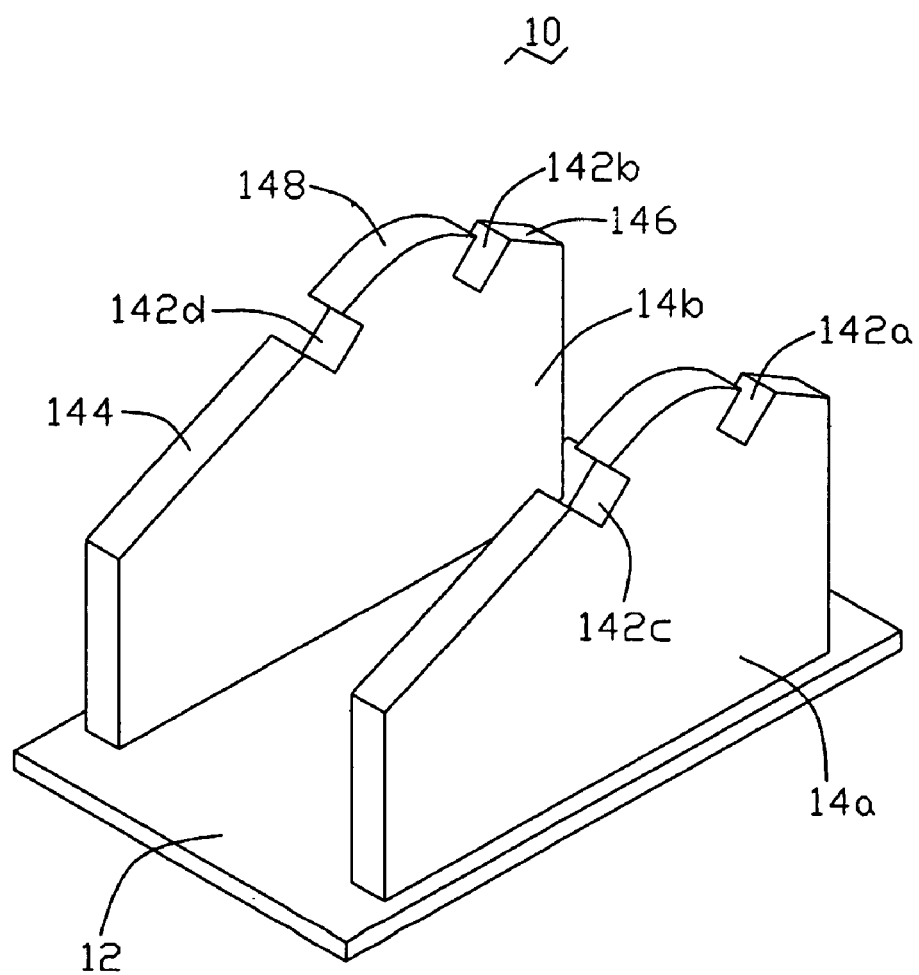
FIG. 1 is a an isometric view of a mounting apparatus in accordance with a preferred embodiment of the present invention.
Figure 2:
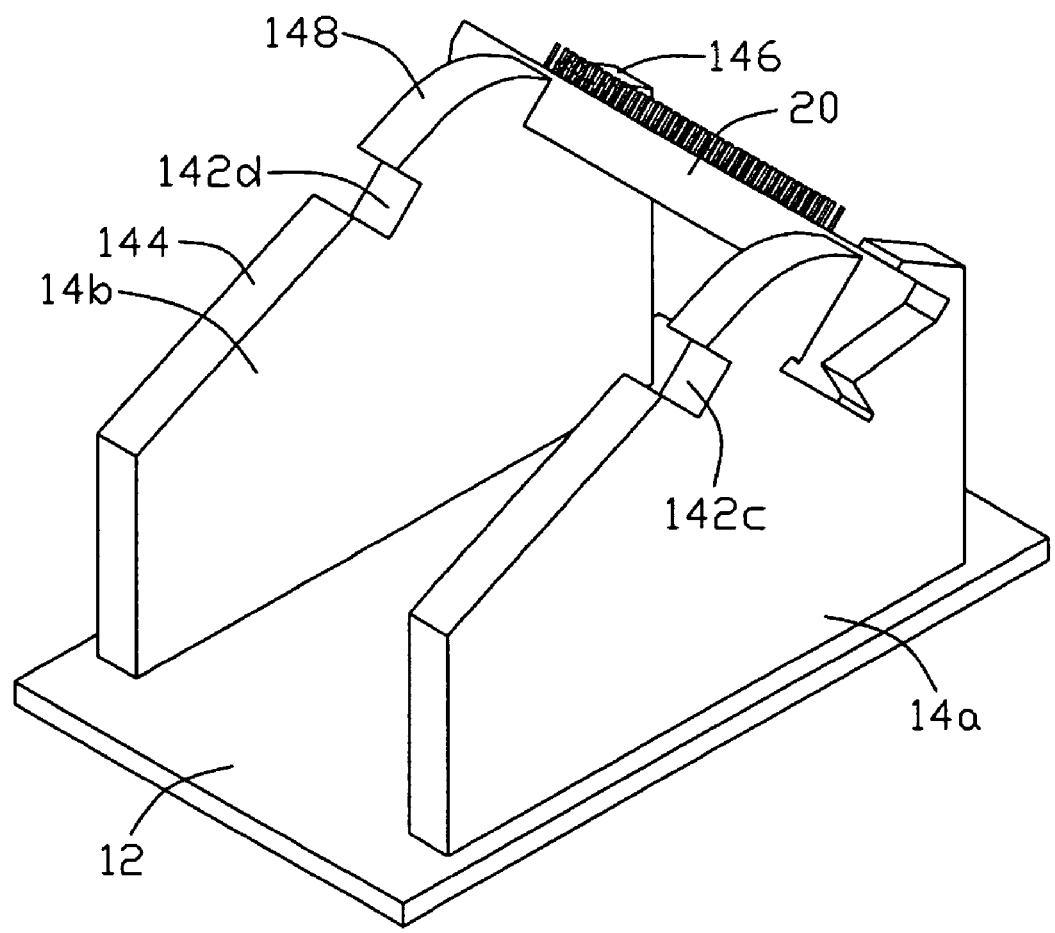
FIG. 2 is an isometric view of the mounting apparatus of FIG. 1 holding a connector.

Referring to FIG. 1 and FIG. 2, a mounting apparatus 10 for holding connectors during a wire wrapping process, includes a base 12, and two shoe plates 14a and 14b formed on a top surface of the base 12. The shoe plates 14a and 14b are standing parallel with each other. A top of each shoe plate includes a first slanting surface 144, a second slanting surface 146, and an arc-shaped surface 148 connecting the first slanting surface 144 and the second slanting surface 146. The shoe plates 14a and 14b define corresponding U-shaped grooves 142a and 142b respectively between the second slanting surface 146 and the arc-shaped surface 148 thereof for holding a connector 20 which is used to connect PCA test equipment with test pins. The interval between the shoe plates 14a and 14b is less than the length of the connector 20.

The shoe plates 14a and 14b further define corresponding U-shaped grooves 142c and 142d respectively between the first slanting surface 144 and the arc-shaped surface 148 thereof for holding another connector. The grooves 142c, 142d and the grooves 142a, 142b are defined along different directions.

In alternative embodiment of the invention the grooves may be of other shapes corresponding to objects to be hold by the apparatus. The mounting apparatus 10 further includes another pair of shoe plates define corresponding grooves for holding any other connectors.

The mounting apparatus 10 holds the connector 20 via the shoe plates 14a and 14b, allowing expedient wire wrapping.

It is to be understood, however, that even though numerous characteristics and advantages of the present embodiments have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mounting apparatus comprising:
   a base configured for placing the mounting apparatus on a platform to position the mounting apparatus on the platform; and
   a pair of shoe plates integrally formed on a top surface of the base, and each of the pair of shoe plates comprising a plurality of grooves defined in top surfaces thereof, wherein two parallel corresponding grooves of the pair of shoe plates are capable of firmly holding a connector configured for accepting wire wrapping to establish electrical connection, the connector is capable of being selectively held in every two parallel corresponding grooves of the pair of shoe plates for allowing expedient wire wrapping;
   wherein the interval between the pair of shoe plates is less than the length of the connector.

2. The mounting apparatus as claimed in claim 1, wherein the pair of shoe plates is standing parallel with each other.

3. An assembly for wire wrapping, comprising:
   a connector for accepting wire wrapping to establish electrical connection; and
   a mounting apparatus comprising a base for placement of said mounting apparatus on a platform to position said mounting apparatus on the platform, a pair of shoe plates integrally extending away from said base and each plate of said pair of shoe plates spaced from the other plate of said pair of shoe plates for a preset distance, a plurality of grooves formed on an end surface of said each plate of said pair of shoe plates and facing away from said base so as to partially receive said connector in selected two parallel corresponding grooves of said pair of shoe plates to allow said connector to be firmly placed between said pair of shoe plates for accepting said wire wrapping.

4. The assembly as claimed in claim 3, wherein said end surface of said each plate is inclined relative to said base.

5. The assembly as claimed in claim 4, wherein said end surface of said each plate is an arc-shaped surface, the plurality of grooves comprises two grooves defined in two opposite ends of the arc-shaped surface of each shoe plate respectively, the connector is capable of being selectively held in two corresponding grooves of the pair of shoe plates.

* * * * *

UNITED STATES PATENT AND TRADEMARK OFFICE
CERTIFICATE OF CORRECTION

PATENT NO. : 7,631,420 B2  Page 1 of 1
APPLICATION NO. : 11/518796
DATED : December 15, 2009
INVENTOR(S) : Li et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 149 days.

Signed and Sealed this

Second Day of November, 2010

David J. Kappos
*Director of the United States Patent and Trademark Office*